(12) United States Patent
Yip et al.

(10) Patent No.: US 12,288,147 B2
(45) Date of Patent: Apr. 29, 2025

(54) SYSTEMS AND METHODS FOR GENERATING MEAL RECOMMENDATIONS

(71) Applicant: Capital One Services, LLC, McLean, VA (US)

(72) Inventors: Samuel Yip, East Brunswick, NJ (US); Mario Alejandro Garcia, Arlington, VA (US); Roberto Irizarry, Vienna, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/479,788

(22) Filed: Oct. 2, 2023

(65) Prior Publication Data
US 2025/0111290 A1  Apr. 3, 2025

(51) Int. Cl.
| | | |
|---|---|---|
| *G06Q 30/02* | (2023.01) | |
| *F25D 29/00* | (2006.01) | |
| *G06N 20/20* | (2019.01) | |
| *G06Q 30/0207* | (2023.01) | |
| *G06Q 10/087* | (2023.01) | |

(52) U.S. Cl.
CPC ............ *G06N 20/20* (2019.01); *F25D 29/00* (2013.01); *G06Q 30/0224* (2013.01); *F25D 2500/06* (2013.01); *G06Q 10/087* (2013.01); *G06Q 30/0223* (2013.01)

(58) Field of Classification Search
CPC ............ G06Q 10/087; G06Q 30/0631; G06Q 20/203; G16H 20/60; G06F 16/9535; G06F 16/90324
See application file for complete search history.

(56) References Cited

U.S. PATENT DOCUMENTS

| | | |
|---|---|---|
| 11,144,957 B1 | 10/2021 | Raak et al. |
| 11,334,892 B2 | 5/2022 | Hamooni et al. |
| 2012/0303638 A1* | 11/2012 | Bousamra .............. G16H 20/60 707/751 |
| 2014/0095479 A1* | 4/2014 | Chang ................ G06Q 30/0631 707/E17.005 |
| 2018/0061270 A1* | 3/2018 | Chainer ............... G06Q 10/087 |
| 2018/0075218 A1* | 3/2018 | Benefield ............... G16H 20/60 |
| 2018/0082361 A1* | 3/2018 | Wilkinson ......... G06Q 30/0639 |

(Continued)

FOREIGN PATENT DOCUMENTS

| | | |
|---|---|---|
| CN | 110490635 A | 11/2019 |
| GB | 2556515 A | 5/2018 |

*Primary Examiner* — Vincent M Cao
(74) *Attorney, Agent, or Firm* — TROUTMAN PEPPER LOCKE LLP; Christopher J. Forstner; John A. Morrissett

(57) ABSTRACT

Disclosed embodiments may include a method for generating meal recommendations by receiving first data and user input data. The system may generate a food profile and estimate of ingredients based on the first data and the user input data. The system may generate, based on the estimate of ingredients, one or more cooking instructions or an output that the user does not have sufficient ingredients. If cooking instructions are generated, the system may generate and transmit a graphical user interface comprising the one or more cooking instructions based on the estimate of ingredients for display. If it is determined the user does not have sufficient ingredients, the system may generate and transmit a graphical user interface comprising one or more dining options for the user for display.

20 Claims, 5 Drawing Sheets

(56) References Cited

U.S. PATENT DOCUMENTS

| | | | | |
|---|---|---|---|---|
| 2019/0130005 A1* | 5/2019 | Byron | ............... | G06F 16/24575 |
| 2022/0013213 A1* | 1/2022 | Martinez | .......... | G06Q 10/08345 |
| 2022/0215061 A1* | 7/2022 | Nigul | ..................... | G06N 20/00 |
| 2022/0383433 A1* | 12/2022 | Moton, Jr. | ............. | G06Q 50/12 |
| 2024/0055101 A1* | 2/2024 | Panetta | .................. | G06Q 10/06 |

* cited by examiner

SYSTEMS AND METHODS FOR GENERATING MEAL RECOMMENDATIONS

FIELD

The disclosed technology relates to systems and methods for generating meal recommendations. Specifically, this disclosed technology relates to determining the supplies or ingredients a user has available to cook with, determining meal options or recipes the user can cook from the supplies and ingredients, and providing the meal options to the user.

BACKGROUND

Meal recommendation systems tend to require a large amount of user input, including, for example, entering the food available to use, which is time consuming and work intensive for users. Because those systems are dependent on user input, they frequently produce irrelevant, incomplete, or inaccurate meal recommendation results, further decreasing their helpfulness. Many such systems also lack the ability to customize meals to individual user needs, palates, or based on ingredients a user has.

Accordingly, there is a need for improved systems and methods for generating meal recommendations. Embodiments of the present disclosure are directed to this and other considerations.

SUMMARY

Disclosed embodiments may include a system for generating meal recommendations. The system may include one or more processors, and memory in communication with the one or more processors and storing instructions that, when executed by the one or more processors, are configured to cause the system to generating meal recommendations. The system may receive or retrieve first data and user input data associated with a user. The system may also identify ingredient data from the first data. Furthermore, the system may generate, using a first machine learning model, a food profile for the user, based on the ingredient data and the user input data. The system may additionally generate, using a second machine learning model, an estimate of ingredients based on the ingredient data and the user input data; determine, from the estimate of ingredients, whether the user has sufficient ingredients to make a meal. In response to determining that the user has sufficient ingredients, the system may generate, using a third machine learning model, based on the estimate of ingredients the user has remaining and the food profile, one or more cooking instructions, generate a first graphical user interface comprising the one or more cooking instructions based on the estimate of ingredients the user has remaining, and transmit the first graphical user interface to a user device for display. In response to determining that the user does not have sufficient ingredients, the system may generate, using a fourth machine learning model, based on the food profile, one or more dining options for the user, generate a second graphical user interface comprising the one or more dining options, and transmit the second graphical user interface to the user device for display.

Disclosed embodiments may include a system for generating meal recommendations. The system may include one or more processors, and memory in communication with the one or more processors and storing instructions that, when executed by the one or more processors, are configured to cause the system to generating meal recommendations. The system may receive or retrieve first data and user input data associated with a user. The system may also generate, using a first machine learning model, an estimate of ingredients based on the first data and the user input data. Furthermore, the system may generate, using a second machine learning model, based on the estimate of ingredients, one or more cooking instructions or an output that the user does not have sufficient ingredients to use any of the one or more cooking instructions. In response to generating the one or more cooking instructions, the system may generate a first graphical user interface comprising the one or more cooking instructions based on the estimate of ingredients the user has remaining and transmit the first graphical user interface to a user device for display. In response to generating the output that the user does not have sufficient ingredients to use any of the one or more cooking instructions, the system may generate, using a third machine learning model, based on the user input data and the first data, one or more dining options for the user, generate a second graphical user interface comprising the one or more dining options, and transmit the second graphical user interface to the user device for display.

Disclosed embodiments may include a system for generating meal recommendations. The system may include one or more processors, and memory in communication with the one or more processors and storing instructions that, when executed by the one or more processors, are configured to cause the system to generating meal recommendations. The system may receive or retrieve first data and user input data associated with a user. The system may also generate, using a first machine learning model, based on the first data and the user input data, one or more cooking instructions or an output that all of the one or more cooking instructions require additional ingredients to cook. In response to generating the one or more cooking instructions, the system may generate a first graphical user interface comprising the one or more cooking instructions and transmit the first graphical user interface to a user device for display. In response to generating the output that all of the one or more cooking instructions require additional ingredients to cook, the system may generate a second graphical user interface comprising the one or more cooking instructions and including one or more ingredients that the user needs to obtain to follow the cooking instructions and transmit the second graphical user interface to the user device for display.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
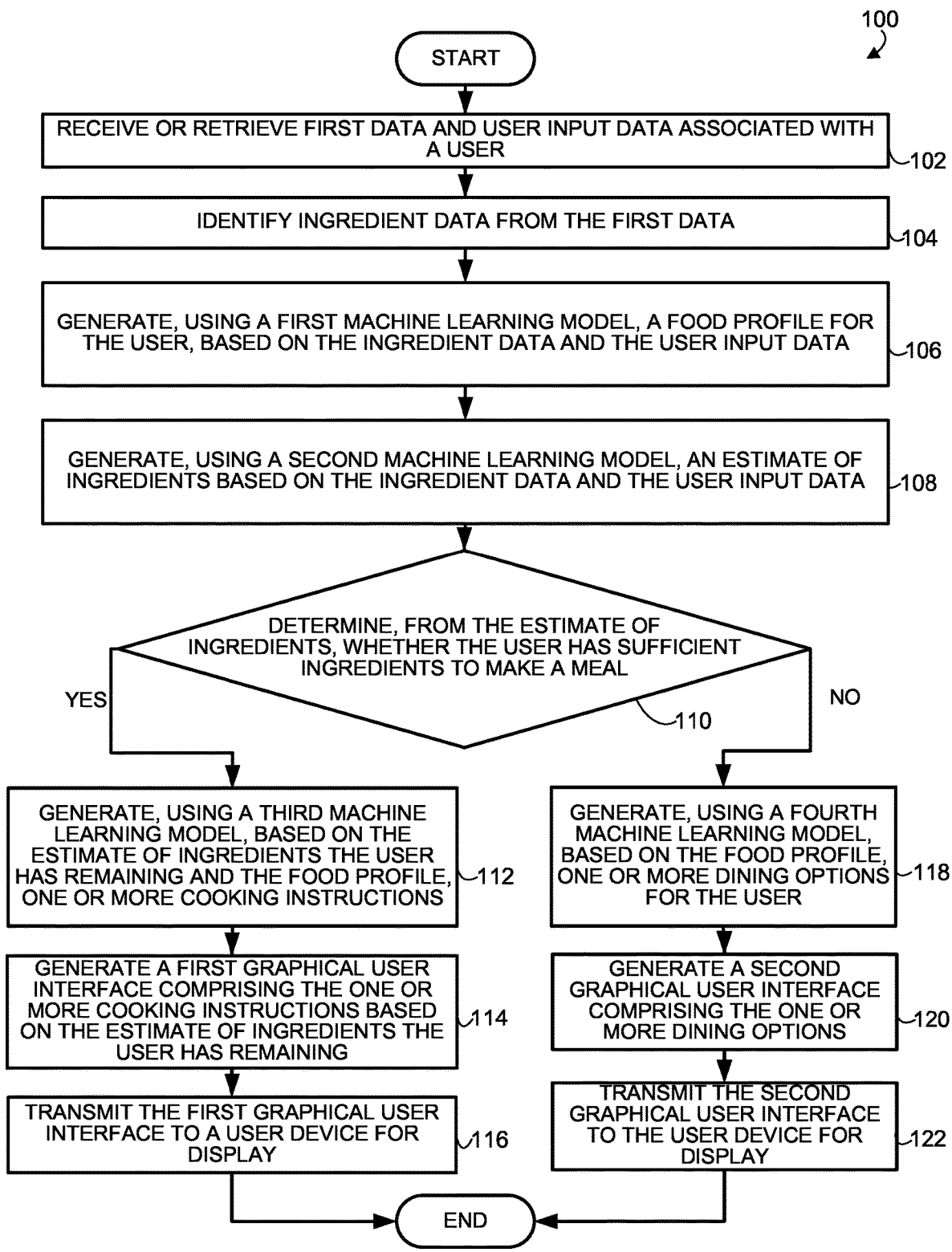
FIG. 1 is a flow diagram illustrating an exemplary method for generating meal recommendations in accordance with certain embodiments of the disclosed technology.

Consumers frequently shop for groceries and cook meals. However, many consumers purchase more ingredients than they need for a specific meal. Therefore, consumers tend to have left over ingredients and are unsure of what meals can be made with them. Alternatively, consumers may be unsure what they need to purchase to complete a recipe. These situations cause consumers to waste food or use food in meals that may not be ideal.

The disclosed technology relates to determining the supplies and ingredients a user has available to cook with, determining meal options or recipes the user can cook, dynamically changing recipes based on the number of people the user is serving, and providing those to the user. Alternatively, if the user does not have enough supplies or the correct supplies to make a meal, the system can suggest nearby places to obtain the necessary ingredients, restaurants, and other food venues. The system may use transaction data from a user's credit or debit card to determine the supplies and/or ingredients a user has available. The user may also provide information regarding ingredients they have available to the system and specific cuisines that they enjoy preparing and/or consuming.

Examples of the present disclosure related to systems and methods for generating meal recommendations. More particularly, the disclosed technology relates to receiving data regarding ingredients or supplies a user has available, and user data, and suggesting meals the user may cook with the ingredients they have available. The systems and methods described herein utilize, in some instances, one or more machine learning models, which are necessarily rooted in computers and technology. Machine learning models are a unique computer technology that involves training models to complete tasks and make decisions. The present disclosure details machine learning models that generate a food profile for the user, estimate the ingredients a user has available, generate one or more cooking instructions based off of the estimate of ingredients and food profile, or, in the event the user does not have adequate ingredients, generate one or more dining options. Using a machine learning model in this way may allow the system to provide a user with options for food ingredients that the user would otherwise not know about, with minimal data input from the use (e.g., if the ingredients are input to the system via transaction data). As the user selects recipes and meals, the machine learning models may be iteratively trained by the user's choices and behavior, and therefore, modify the user's food profile and other user data. This may be used to iteratively change the suggested outputs of the one or more machine learning models, and influence the recipes suggested to the user and other users.

The systems and methods described herein utilize, in some instances, graphical user interfaces, which are necessarily rooted in computers and technology. Graphical user interfaces are a computer technology that allows for user interaction with computers through touch, pointing devices, or other means. The present disclosure details receiving data via a generated graphical user interface from a user via a user device. This, in some examples, may involve using the output from one or more machine learning models to dynamically change the graphical user interface to present a variety of recipe options in a specific order. The user may provide more information via the graphical user interface, which may result in the system changing the graphical user interface to present the recipes in a different order. Using a graphical user interface in this way may allow the system to help the user to find the ideal recipe for the ingredients they have available. This also allows for the system to learn from the user inputs to the graphical user interface. For example, the user may select or modify certain recipes via the graphical user interface, which the system may use to influence the order or choice of recipes in future outputs. This helps to improve recipes suggested to the user over time. Overall, the systems and methods disclosed have significant practical applications because they help a user to find a meal they enjoy eating, with the ingredients they have available, while also reducing food waste.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for generating meal recommendations, in accordance with certain embodiments of the disclosed technology. The steps of method 100 may be performed by one or more components of the system 400 (e.g., meal recommendation system 320 or web server 410 of data system 408 or user device 402), as described in more detail with respect to FIGS. 3 and 4.

In block 102, the meal recommendation system 320 may receive or retrieve first data and user input data associated with a user. The first data may comprise transaction data (e.g., from a bank account) or transaction card data. Transaction card data may include data associated with a debit and/or credit card. The transaction data may include specific information about a purchase. For example, the transaction data may include the date and time of the transaction, merchant, merchant location, merchant category (e.g., specialty foods store or grocery store), or if the card was or was not present at the transaction. Furthermore, the transaction data may include purchase data, which may comprise item-specific data. The item-specific data may include a name or description of the item purchased, the quantity of the item purchased, the price of the item purchased, or an identification number or marking of the item purchased (e.g., a stock keeping unit or "SKU"). The transaction data and/or transaction card data may include data from restaurants that the user has purchased a meal from.

The user data may comprise information about the user. The user data may be associated with an account of the user, such as a bank account or credit account. This may include standard information about the user or user-provided information such as name, age, or credit status. The user data may also include a billing location, such as the user's home address, or an actual location, as transmitted to meal recommendation system 320 from a user device associated with the user, as calculated via cellular triangulation or global positioning system (GPS). Additionally, the user data may include food preferences of the user. The user may provide, via the associated user device, food preferences, meal preferences, meal tracking information, food allergies, or dietary restrictions. Additionally, the user may provide, or may be asked to provide an example of meals that they consume on a weekly or monthly basis. The user may also provide information regarding the number of people that the usually cook for in a typical meal (dining party size) and/or the user's preference for having leftovers after cooking a meal. Transaction data may also be used to predict food preferences for the food profile or determine the number of persons typically in a meal (e.g., by reviewing charges from restaurants to determine an estimated average cost per diner).

The meal recommendation system 320 may generate a graphical user interface comprising a query to the user regarding the food preferences, meal preferences, or dietary restrictions. The graphical user interface may contain drop-down menus, check-box selections, or multiple-choice selections that allow the user to input their food preferences. This may comprise the user ranking different types of cuisine or desired portion sizes. Alternatively, the user may be able write-in, or enter food preferences manually. The meal recommendation system may transmit the graphical user interface 320 to the user device for input from the user. The meal recommendation system 320 may receive user input via the graphical user interface presented on the user device. Additionally, the graphical user interface may allow the user to change other user data, or link specific accounts to the meal recommendation system 320 (e.g., bank accounts, credit card accounts, and debit card accounts) that the system may use to track purchase information. The user may also be able to link a smart refrigerator and/or an account associated with a smart refrigerator to meal recommendation system 320. This may allow meal recommendation system 320 to determine ingredients the user has available to cook with from the smart refrigerator's data system (e.g., cameras). Additionally, the meal recommendation system 320 may be able to link with other smart devices (e.g., smart oven or smart air fryer).

In some embodiments, the user may be able to use the graphical user interface to input other food or ingredient items the user has available to cook that the meal recommendation system 320 may not be able to capture from analyzing transaction data (e.g., if the ingredient was purchased with cash from a local farmer's market). The graphical user interface may provide an input location where the user, via the user device, may input additional ingredients they have available. Furthermore, the user may also be able to use the graphical user interface to provide data to meal recommendation system 320 that the user has already used or no longer has an ingredient available (e.g., if an ingredient has expired or 'gone bad' prematurely). The meal recommendation system 320 may be able to generate prompts to the user via the graphical user interface that prompt the user to respond if they have a certain ingredient (e.g., "Do you have an orange?" or "Is your milk still good to consume?"). The user may, via the user device, be able to provide meal recommendation system 320 with information regarding past meals the user has consumed. The meal recommendation system 320 may also be able to identify the quantity of an amount of food purchased by comparing a food item cost using the transaction data to a known cost of a unit price of an item (e.g., determining that the user bought 3 pounds of ground beef if the transaction data shows a charge for $15 and ground beef is $5 per pound).

In block 104, the meal recommendation system 320 may identify ingredient data from the first data. The meal recommendation may use the transaction data and/or transaction card data to determine which of the items the user has purchased are relevant to food and meal preparation. This may be completed by analyzing the item-level description of the purchased item. For example, the system may identify that an item described as "milk" is an ingredient the user has available from an item-level description of the transaction data. However, the system may ignore other items from the same transaction, such as an item described as "television." The system may also not identify certain food items as ingredients, such as an item described as "potato chips" because they are not common ingredients.

In block 106, the meal recommendation system 320 may generate a food profile for the user based on the ingredient data and user input data. The food profile may comprise predicted or known information about the user's food choices, such as the frequency certain types of cuisine is consumed. For example, the user may indicate they enjoy Chinese food. The meal recommendation system 320 may also receive transaction data indicating that the user goes to an Italian restaurant every two weeks. The food profile of the user may include details that the user enjoys Chinese and Italian food. The system may also predict that since the user enjoys Chinese food, the user may also enjoy Thai food. The food profile may be multi-faceted and time-dependent (e.g., the user enjoys Mexican food, but not more than twice a week). The food profile may also take into account the price of food (e.g., the user only likes to eat Italian food where the average plate costs greater than $30 per person). The food profile of a user may evolve over time or change iteratively as more data is received regarding the user's tastes or the user's tastes change (e.g., if a user develops an interest in Greek food, and begins to eat Greek food more frequently, the meal recommendation system 320 may add a Greek influence to the user's food profile). The transaction data may also be used to determine a type of store the user frequently visits, which may imply types of food they enjoy consuming (e.g., shopping a local kosher food store may imply the user only eats kosher foods, whereas shopping at a large grocery chain has fewer implications about the user's diet), and, therefore, alter the user's food profile. Item-level transaction data may also be used to change the user's food profile.

The meal recommendation system 320 may utilize a first machine learning model to aid in generating the food profile. The first machine learning model may be a clustering model. The first machine learning model may use clustering to determine users that have food tastes that are similar to one another. The first machine learning model may use feedback from the transaction data and user profile data from one user to generate or modify the food profile of another user. The first machine learning model may also use feedback from the transaction data and user profile data from a user to iteratively change and refine the food profile to more accurately reflect a user's tastes.

In block 108, the meal recommendation system 320 may generate an estimate of ingredients based on the ingredient data and the user input data. The meal recommendation system 320 may utilize a second machine learning model to predict what ingredients and how much of the ingredients are left and what ingredients can be used by the user. The meal recommendation system 320 may utilize a prediction model that considers time. For example, if meal recommendation system 320 retrieves transaction data indicating that the user last went to the store 15 days ago, the meal recommendation system 320 may determine that certain perishable items (e.g., milk) that the user purchased at that time are no longer usable. The meal recommendation system 320 may use other transaction data to determine if the user has been available to cook meals at home (e.g., if the user bought food three days previously, then went out to eat for each meal, it would indicate that the user probably has not used most of the ingredients). The output from this step may be a list of ingredients that the user is anticipated to have to a certain degree of certainty. The degree of certainty may be predetermined and may be specific to each ingredient. The meal recommendation system 320 may prompt the user to provide information, via the graphical user interface, regarding the usability of ingredients that are below the predetermined threshold. The second machine learning model may utilize $3^{rd}$ party data information from meal tracker software, such as weight tracker applications.

In some embodiments, the user may provide user data, via the graphical user interface, indicating the ingredients they have used since they last purchased additional ingredients, the ingredients they have available to use, or indicate the meals they have made with the ingredients. From this information, the meal recommendation system 320 may determine an estimate of the remaining ingredients that the user has available to use to make meals. The meal recommendation system 320 may use information from other data sources, such as a smart fridge, to make an estimate regarding the ingredients the user has available. The meal recommendation system 320 may also use the information from other data sources to confirm predictions made from transaction data (e.g., if the transaction data indicates the user bought cucumbers five days ago, the meal recommendation system 320 can use data from the smart fridge to confirm that the cucumbers are still in the fridge, unused, and available for use). The meal recommendation system 320 may estimate that certain ingredients are always available to the user (e.g., water).

In block 110, the meal recommendation system 320 may determine, from the estimate of ingredients, whether the user has sufficient ingredients to make a meal. This may be a predetermination step which may not be present in all embodiments. The meal recommendation system 320 may determine if the estimated ingredients are sufficient to make a meal. This may be completed using rules-based decisioning. For example, the system may comprise rules that require meals to contain a protein. If the estimated ingredients are potatoes, rice, and butter, the meal recommendation system 320 may determine, using the rules, that the user does not have sufficient ingredients to make a meal. However, if, in the same scenario, the estimated ingredients also included eggs, then the system may determine, using the rules, that the user does have sufficient ingredients to make a meal. The rules may be global and affect every user or may be user-specific and may be set by the user as part of the user input data. Other rules may include: type of cuisine limitations (e.g., only meals of a certain type), requiring all food groups (e.g., one protein, one vegetable, one carbohydrate, or variations thereof), dietary restrictions (e.g., gluten-free), allergies, budget (e.g., by analyzing prices of items), cooking equipment (e.g., whether the user has a slow cooker or wok), or specific rules set by the user via the graphical user interface.

If the user has sufficient ingredients to make a meal, the process may continue to block 112. If the user does not have sufficient ingredients to make a meal, the process may continue to block 118.

In block 112, the meal recommendation system 320 may generate, based on the estimate of ingredients the user has remaining and the food profile, one or more cooking instructions. The meal recommendation system 320 may utilize a third machine learning model to aid in generating the cooking instructions. The third machine learning model may be a classification model. The cooking instructions may be a recipe. The cooking instructions may be derived from a known recipe that may be retrieved from a database and may be personalized to the user. The meal recommendation system 320 may match the estimate of ingredients with all known recipes in the database that use no more than the available ingredients. The meal recommendation system 320 may also include all recipes that the user can make with small changes or ingredient substitutions. The one or more cooking instructions may be presented in an order based on the food profile or other information about the user.

In some embodiments, the meal recommendation system 320 may modify the known recipe to the user according to the food profile and/or user data. For example, the user data may indicate that the user typically cooks for two people and the known recipe feeds six. The meal recommendation system 320 may reduce the ingredient requirements by one-third in order to have an appropriate serving size. Additionally, if the known recipe uses peanuts, and the user is allergic to peanuts, then then the meal recommendation system 320 may substitute another usable ingredient for the peanuts (such as cashews). The user may have to opt-in for the system to show ingredient substitutes. This may be completed using a graphical user interface.

In some embodiments, if the known recipe contains an ingredient that the meal recommendation system 320 is unsure the user has available (e.g., an ingredient that the confidence is not above a predetermined threshold), then the meal recommendation system 320 may flag or notate the ingredient. In some embodiments, the meal recommendation system 320 may ask the user via a graphical user interface if the ingredient is available.

In some embodiments, if the user does not have enough ingredients available for any of the known recipes, the meal recommendation system 320 may indicate the closest possible meal that the user can create from what they have. The meal recommendation system 320 may indicate to the user what ingredient(s) they need to purchase to complete the meal. The meal recommendation system 320 may be capable of configuring portion sizes of a meal to the ingredients a user has, or changing the portion size so that the ingredients can feed the number of people in the user's party.

In some embodiments, blocks 110 and 112 may be combined. Accordingly, the meal recommendation system 320 may use the estimate of ingredients to attempt to generate the one or more cooking instructions. If that process succeeds, and the meal recommendation system is able to generate one or more cooking instructions, the process may continue to block 114. If that process fails, and the meal recommendation system in unable to generate one or more cooking instructions, the process may continue to block 118.

In block 114, the meal recommendation system 320 may generate a graphical user interface comprising the one or more cooking instructions based on the estimate of ingredients the user has remaining. The graphical user interface may be a first graphical user interface or a dynamic update to a previous graphical user interface generated to receive data from the user via the user device. The graphical user interface may comprise a list of the one or more cooking instructions. The order of the cooking instructions may be based on the output of block 112. The order of the cooking instructions may be such that the cooking instructions that the meal recommendation system predicts the user will be most interested in may be listed first (e.g., if the user profile indicated the user likes hearty Italian dishes, then a meat lasagna may be listed before a chicken salad). Additionally, the graphical user interface may present dishes the user is able to cook first, followed by dishes that the user may be able to cook (or require a substitution of ingredients), followed by dishes that the user needs to obtain additional ingredients for. Furthermore, the order or ranking or dishes may be presented based on if a user has previously consumed a dish of a certain cuisine (e.g., if the user ate Japanese food on Friday, the meal recommendation system 320 may not recommend that the user eat Japanese food again until a set amount of time later, for example, a week). Alternatively, the system may order certain cuisines that the user has consumed recently further down on the graphical user interface.

In block 116, the meal recommendation system 320 may transmit the graphical user interface to the user device for display. The user device may receive the graphical user interface and display the graphical user interface on the user device so that the user may view and interact with the list of one or more cooking instructions. The graphical user interface may allow the user, via the user device, to scroll through a variety of cooking instructions. Accordingly, the graphical user interface may update the list as the user scrolls through the options. The graphical user interface may also be capable of receiving data from the user regarding the one or more cooking instructions. For example, the user may be able to rate, rank, or order the cooking instructions on the graphical user interface. As a result, the meal recommendation system 320 may update the one or more machine learning models and the food profile of the user based upon the user feedback provided via the graphical user interface. The graphical user interface may change as a result of the input from the user. For example, if the user deletes or downvotes a recipe of the one or more recipes, the graphical user interface may actively reorder the remaining recipes in the list. The meal recommendation system 320 may use the input from the user to train one or more machine learning models.

In some embodiments, the graphical user interface may present the user with a list with the names of possible meals. The user may need to select the possible meals from the list via the graphical user interface in order for the graphical user interface to show the cooking instructions for the specific meal. The graphical user interface may highlight certain features of the cooking instructions. For example, the graphical user interface may highlight ingredient substitutions, ingredients that the meal recommendation system 320 is not confident the user has, and modifications that the meal recommendation system 320 made to the known recipe (e.g., changing portion sizes). The graphical user interface may show interactive media of the cooking instruction, such as a photo or video. The photo or video may be provided by other users and uploaded via the graphical user interface. The graphical user interface may also present other information about the cooking instructions and/or food profile of the user, such as "345 people liked this recipe" or "You have enjoyed this meal three times in the last two months." In some embodiments, once a recipe is chosen, the meal recommendation system 320 may be able to automatically transfer necessary directions to the smart device to begin food preparation (e.g., user chooses a recipe requiring an oven at 175 degrees Celsius, then the meal recommendation system 320 automatically communicates with the smart oven to preheat the oven to 175 degrees Celsius). Alternatively, meal recommendation system 320 may be able to communicate with a smart device to automatically set a timer.

In some embodiments, the meal recommendation system 320 may determine, from the estimate of ingredients, that the user is running low on ingredients. The system may identify certain ingredients that are common among an assortment of recipes or recipes frequently cooked by the user. The system may generate and transmit a graphical user interface to be presented on the user device that may remind the user that they are running low on ingredients. This may be generated and transmitted by the user device as a notification. The graphical user interface may include details regarding stores where the user may purchase the ingredients (e.g., a store close to the user device, as calculated by GPS from a user device or a store close to the user's home, as determined by the user's billing address). Some details regarding stores may include advertisements. The advertisements may be specific to the items the user needs to purchase. The advertisement may include coupons to the store. The coupons may be specific to the particular items that the user needs to purchase. The meal recommendation system 320 may also recommend other items from stores that the user has not used in the past that the system determines the user may enjoy in recipes in the future. The graphical user interface may comprise an interactive map to present on the user device that shows the user's location and a store's location. The interactive map may be able to update the user device's location and give the user turn-by-turn directions to a store. The meal recommendation system 320 may also use the transaction data to determine which types of stores the user frequently visits in order to make better suggestions for a store to visit (e.g., if the user frequently shops at health food stores rather than supermarkets, then the system may recommend a health food store before a supermarket).

In some embodiments, the meal recommendation system 320 may show that the user does not have the appropriate ingredients to make the recipe. The recipe entry on the graphical user interface may display a notice or symbol indicating that an ingredient is missing (e.g., "missing celery"). The graphical user interface may provide an indication of where the user could purchase the missing ingredient. The indication may be of a store, and may include an advertisement or coupon (e.g., the advertisement may be specific to the missing item), as described in detailed embodiments above.

In some embodiments, the meal recommendation system 320 may allow the user to opt-in showing ingredient substitutes using the graphical user interface while presenting the one or more cooking instructions. For example, the user may see that several of the cooking instructions they are interested in have one or more missing ingredients. The graphical user interface may present an option to the user allowing the user to opt-into showing ingredient substitutes. Once selected by the user using the user device, and received by meal recommendation system 320, the graphical user interface may change to show ingredient substitutes. The ingredient substitute option may be a slider or toggle switch. The ingredient substitute option may show ingredient substitutes for all of the cooking instructions on the graphical user interface (global list change) or be limited to a cooking instruction that the user is currently viewing. The ingredient substitutes may be displayed in a different color from the ingredients in the one or more cooking instructions. Alternatively, the ingredients of the one or more cooking instructions may be shown as crossed-out (e.g., if the user does not have milk, milk may be shown on the graphical user interface in crossed-out text, and the ingredient substitute, almond milk, may be shown next to 'milk' in blue text). The user may be able to configure the meal recommendation system 320 to recalculate the recipe for smaller portions or larger portions dynamically.

In block 118, the meal recommendation system 320 may generate one or more dining options for the user. The dining options generated for the user may be based on the food profile. The meal recommendation system 320 may utilize a fourth machine learning model to aid in generating the one or more dining options for the user. The fourth machine learning model may be trained by past user selections, from the user or other users. The fourth machine learning model may be trained to produce similar recommendations to what the user was looking to cook. For example, if the user appeared to be interested in Chinese food (e.g., via selection in the graphical user interface, or by the palate choices from the food profile), then the fourth machine learning model may be trained to suggest local Chinese restaurants. The meal recommendation system 320, upon determining that the user does not have sufficient ingredients to make a meal, may suggest restaurants or other dining options (e.g., food trucks) that the user may be interested in obtaining food from. The meal recommendation system 320 may base dining option recommendations on the food profile of the user (e.g., if the user likes Italian food, and the user has not eaten Italian food recently, then the system may recommend a nearby Italian restaurant). The dining options may be confined to a certain price point guided by the food profile or user account information. Furthermore, the dining options may be specific to an area near the user. The user may have the ability to select the area the dining options are specific to (e.g., from a GPS location of the user device, or 10 minutes from the user's house).

In block 120, the meal recommendation system 320 may generate a graphical user interface comprising the one or more dining options. The dining options may be presented in a list format in a ranking similar to the graphical user interface for the one or more cooking instructions presented in block 114. The dining options may be connected with advertisements for nearby restaurants that the meal recommendation system 320 believes the user will be interested in based on the food profile. The dining options may be presented with coupons that the user can redeem at the restaurant for a discount. Coupons may be for a certain time in the future, based on the food profile. The order of the dining options in a list format may be based on the food profile, user account information, or geographical location of the user device. The order or ranking of the dining options may be based on a determination of what meal recommendation system 320 believes the user would enjoy the most. The graphical user interface displaying the dining options may be generally similar to the graphical user interface for displaying the cooking instructions (as described in block 114).

In some embodiments, the graphical user interface of the block 114 and block 120 may be intertwined. For example, the graphical user interface may present both one or more cooking instructions and one or more dining options together in a format (e.g., a scrollable list). The one or more cooking instructions may be the primary feature of the graphical user interface, but one or more dining options may be intermingled between or after several cooking instruction options with additional text (e.g., "Don't feel like cooking?Try this restaurant near you instead!"). The graphical user interface may also present ingredients the user is missing and the closest stores (as calculated by GPS or location services from a user device) from which the user may obtain the ingredients.

In some embodiments, the meal recommendation system 320 may consider other factors, such as the date and time when determining the order of presenting options to the user. For example, if the user typically goes shopping on Saturdays, the meal recommendation system 320 may recommend dining options for the user first (following block 118) even if the user has sufficient ingredients. Furthermore, if it would be difficult for the user to obtain additional ingredients (e.g., 10 PM on a Sunday night) the system may recommend dining options.

In block 122, the meal recommendation system 320 may transmit the graphical user interface to the user device for display. The graphical user interface may be a second graphical user interface. The graphical user interface may be transmitted to the user device in a largely similar manner as the graphical user interface in block 116 and is not repeated herein for brevity.

Figure 2A:
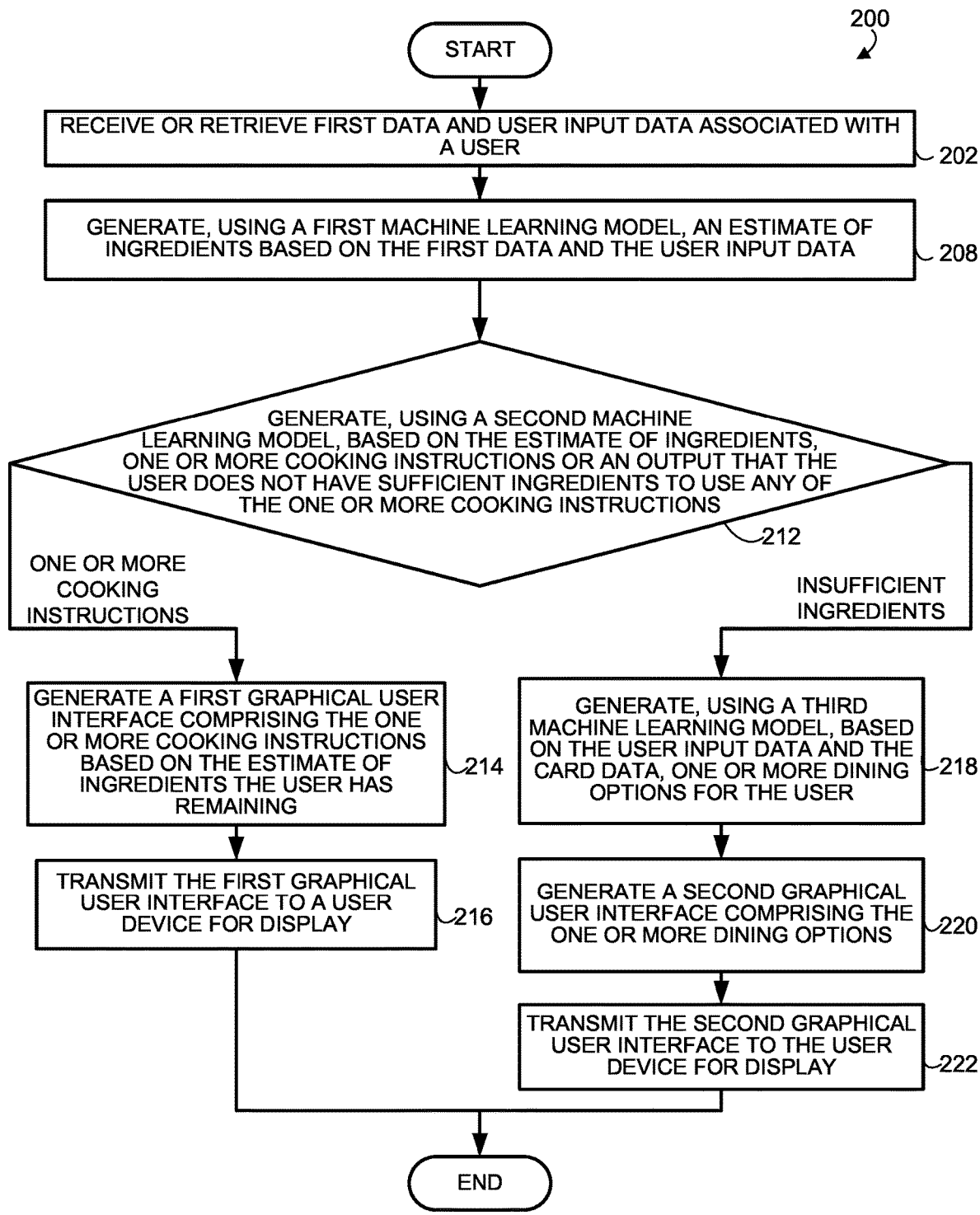
FIG. 2A is a flow diagram illustrating an exemplary method for generating meal recommendations in accordance with certain embodiments of the disclosed technology.

FIG. 2A is a flow diagram illustrating an exemplary method 200 for generating meal recommendations, in accordance with certain embodiments of the disclosed technology. The steps of method 200 may be performed by one or more components of the system 400 (e.g., meal recommendation system 320 or web server 410 of data system 408 or user device 402), as described in more detail with respect to FIGS. 3 and 4.

Method 200 of FIG. 2A is similar to method 100 of FIG. 1, except that method 200 may not include blocks 104, 106, or 110 of method 100. The descriptions of blocks 202, 214, 216, 218, 220, and 222 in method 200 are similar to the respective descriptions of blocks 102, 114, 116, 118, 120, and 122 of method 100 and are not repeated herein for brevity. However, aspects of blocks 208 and 212 contain differences from blocks 108 and 112, which are described below.

In block 208, the meal recommendation system 320 may generate an estimate of ingredients based on the first data and the user input data. The meal recommendation system 320 may not require the filtering step, as described in block 104, to identify ingredient data within the first data, or the generation of a food profile, as described in block 106. The meal recommendation system may use the first data and/or user input data directly to generate the estimate of ingredients. This may be completed using a machine learning model. The machine learning model may be similar to the machine learning model presented with reference to block 108. The machine learning model may have a component to classify or identify ingredient data from the first data and may incorporate the features of block 104. Block 208 may be otherwise similar to block 108 and the descriptions are not repeated herein for brevity.

In block 212, the meal recommendation system 320 may generate, based on the estimate of ingredients, one or more cooking instructions or an output that the user does not have sufficient ingredients to use any of the one or more cooking instructions. The meal recommendation system 320 may not require determination step described in block 110 to predetermine if the user has sufficient ingredients to make a meal before generating cooking instructions. Instead, the meal recommendation system 320 may attempt to generate the cooking instructions. If the meal recommendation system 320 attempts to generate cooking instructions and determines that a threshold number of the generated cooking instructions require additional ingredients or require substitute ingredients (or the meal recommendation system fails to generate any cooking instructions at all due to lack of ingredients), the meal recommendation system 320 may determine that the user does not have sufficient ingredients to use any of the one or more cooking instructions. The threshold may be predetermined, set by the user via the graphical user interface, or may actively change based on feedback from other users. The threshold may require all generated cooking instructions require additional ingredients or substitute ingredients. The threshold may require that the meal recommendation system 320 fails to generate any cooking instructions due to lack of ingredients. This may be completed using a machine learning model. The machine learning model may be similar to the machine learning model presented in block 112.

If the meal recommendation system 320 generates one or more cooking instructions, the method continues to block 214. If the meal recommendation system 320 fails to generate any cooking instructions or determines that the threshold condition is met and the user does not have sufficient ingredients, then the method continues to block 218. Block 212 may otherwise incorporate features presented in blocks 110 and 112 which are not repeated herein for brevity.

Figure 2B:
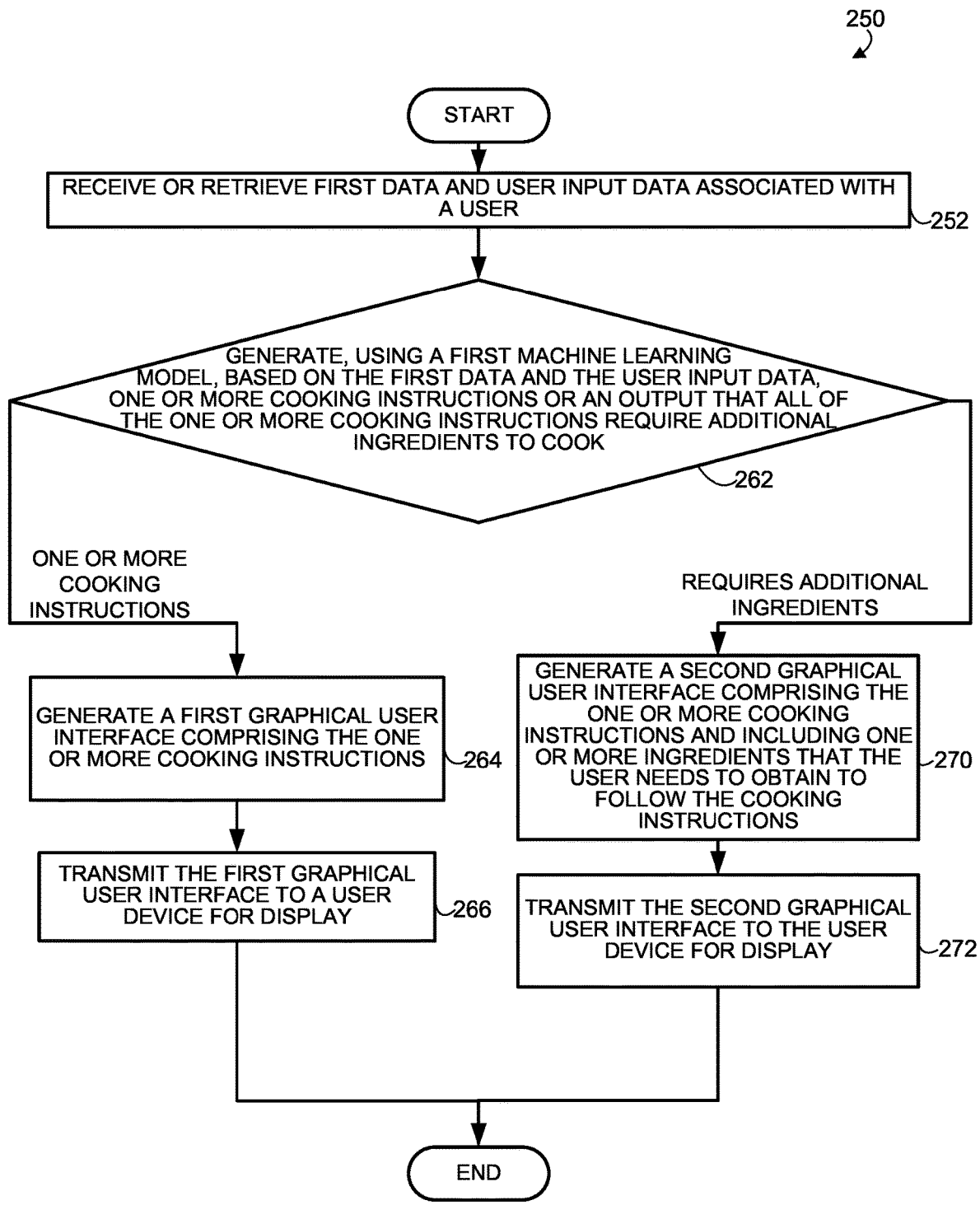
FIG. 2B is a flow diagram illustrating an exemplary method for generating meal recommendations in accordance with certain embodiments of the disclosed technology.

FIG. 2B is a flow diagram illustrating an exemplary method 250 for generating meal recommendations, in accordance with certain embodiments of the disclosed technology. The steps of method 250 may be performed by one or more components of the system 400 (e.g., meal recommendation system 320 or web server 410 of data system 408 or user device 402), as described in more detail with respect to FIGS. 3 and 4.

Method 250 of FIG. 2B is similar to method 200 of FIG. 2A, except that method 250 may not include blocks 208 or 218 of method 200. The descriptions of blocks 252, 264, and 266 in method 250 are similar to the respective descriptions of blocks 202, 214, and 216 of method 200 and are not repeated herein for brevity. However, aspects of blocks 262, 270, and 272 are different from blocks 212, 220, and 222 and are described below.

In block 262, the meal recommendation system 320 may generate cooking instructions based on the user input data and the first data. In an embodiment, the meal recommendation system 320 generates the cooking instructions directly from the first data and user input data without first generating a estimate of ingredients. The meal recommendation system 320 may generate an output that the one or more cooking instructions require additional ingredients to cook. This may be similar to the system described in block 212. However, instead of generating an output that the user does not have sufficient ingredients to use the one or more cooking instructions, the meal recommendation system 320 may generate an output that one or more additional ingredients are needed. The meal recommendation system 320 may generate an output of what additional ingredients are needed for a minimal meal. The meal recommendation system 320 may generate an output of a grocery list of several items that are general items the user needs to purchase to have the option of making several meals. The general list of items may be based on items a user typically purchases based on the first data or the user input data.

The meal recommendation system 320 may utilize one or more machine learning models to generate the cooking instructions from the first data and user input data. The machine learning models may be similar to the machine learning model of block 212 of method 200, with differences to compensate for using the first data and user input data directly, rather than receiving a separately generated estimate of ingredients. In an embodiment, method may proceed to block 264 only if the system generates one or more cooking instructions that do not require additional ingredients. Additionally, the method may proceed to block 270 only if the system determines that a threshold number (e.g., all) of the generated cooking instructions require more ingredients. Therefore, in some embodiments, the system may only display the additional ingredients needed if the user had no other options for meals. This feature may be toggled by the user through the graphical user interface. Block 262 may be otherwise similar to block 212 and the descriptions are not repeated herein for brevity.

In block 270, the meal recommendation system 320 may generate a graphical user interface comprising the one or more cooking instructions and the one or more ingredients that the user needs to obtain to follow one or more cooking instructions. The graphical user interface may comprise the list of ingredients specific to one cooking instruction generated in block 262, or the general list of ingredients. The graphical user interface may be generally similar to the graphical user interface described with reference to blocks 114 and 214 and is not repeated herein for brevity.

In block 272, the meal recommendation system 320 may transmit the graphical user interface from block 270 to the user device for display. This may be similar to blocks 116 and 216 and is not repeated herein for brevity.

Figure 3:
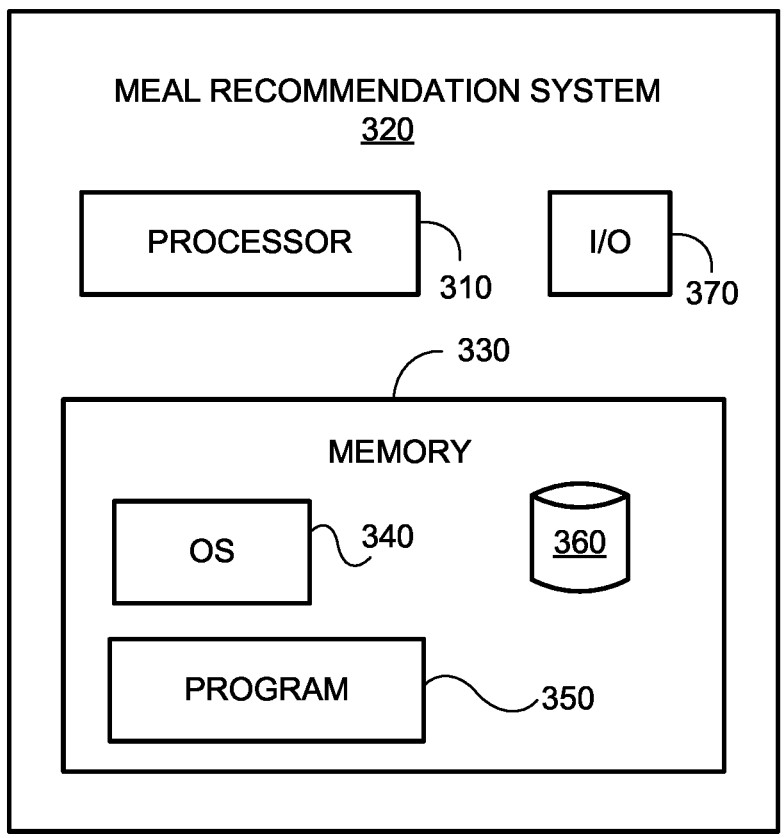
FIG. 3 is block diagram of an example meal recommendation system used to provide generating meal recommendations, according to an example implementation of the disclosed technology.
Figure 4:
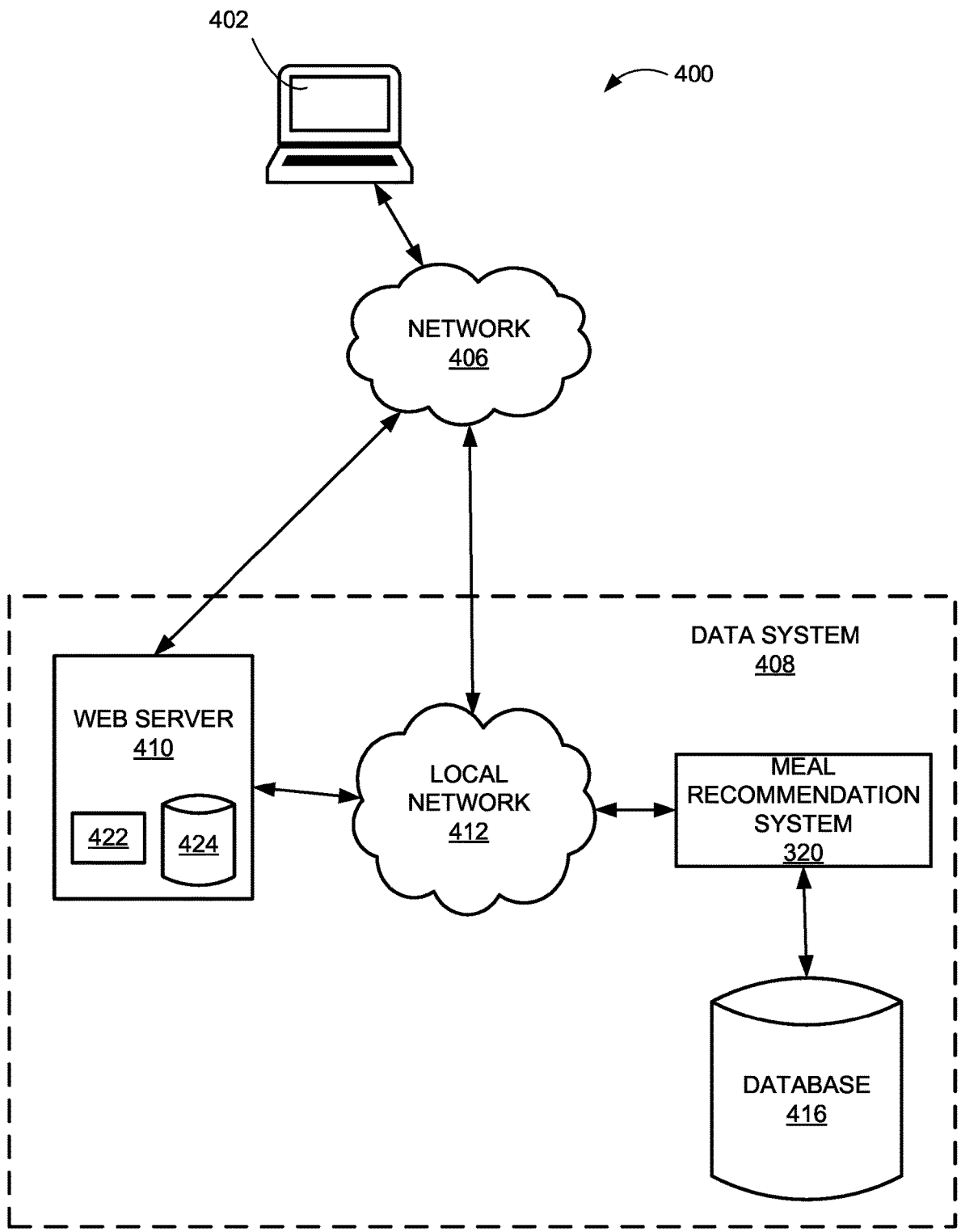
FIG. 4 is block diagram of an example system that may be used to provide generating meal recommendations, according to an example implementation of the disclosed technology.

FIG. 3 is a block diagram of an example meal recommendation system 320 used to generate meal recommendations for a user according to an example implementation of the disclosed technology. According to some embodiments, the user device 402 and web server 410, as depicted in FIG. 4 and described below, may have a similar structure and components that are similar to those described with respect to meal recommendation system 320 shown in FIG. 3. As shown, the meal recommendation system 320 may include a processor 310, an input/output (I/O) device 370, a memory 330 containing an operating system (OS) 340 and a program 350. In certain example implementations, the meal recommendation system 320 may be a single server or may be configured as a distributed computer system including multiple servers or computers that interoperate to perform one or more of the processes and functionalities associated with the disclosed embodiments. In some embodiments meal recommendation system 320 may be one or more servers from a serverless or scaling server system. In some embodiments, the meal recommendation system 320 may further include a peripheral interface, a transceiver, a mobile network interface in communication with the processor 310, a bus configured to facilitate communication between the various components of the meal recommendation system 320, and a power source configured to power one or more components of the meal recommendation system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the meal recommendation system 320 may include one or more storage devices configured to store information used by the processor 310 (or other components) to perform certain functions related to the disclosed embodiments. In one example, the meal recommendation system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The meal recommendation system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the meal recommendation system 320 may include the memory 330 that may include one or more programs 350 to perform one or more functions of the disclosed embodiments. For example, in some embodiments, the meal recommendation system 320 may additionally manage dialogue and/or other interactions with the customer via a program 350.

The processor 310 may execute one or more programs 350 located remotely from the meal recommendation system 320. For example, the meal recommendation system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a meal recommendation system database 360 for storing related data to enable the meal recommendation system 320 to perform one or more of the processes and functionalities associated with the disclosed embodiments.

The meal recommendation system database 360 may include stored data relating to status data (e.g., average session duration data, location data, idle time between sessions, and/or average idle time between sessions) and historical status data. According to some embodiments, the functions provided by the meal recommendation system database 360 may also be provided by a database that is external to the meal recommendation system 320, such as the database 416 as shown in FIG. 4.

The meal recommendation system 320 may also be communicatively connected to one or more memory devices (e.g., databases) locally or through a network. The remote memory devices may be configured to store information and may be accessed and/or managed by the meal recommendation system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The meal recommendation system 320 may also include one or more I/O devices 370 that may comprise one or more interfaces for receiving signals or input from devices and providing signals or output to one or more devices that allow data to be received and/or transmitted by the meal recommendation system 320. For example, the meal recommendation system 320 may include interface components, which may provide interfaces to one or more input devices, such as one or more keyboards, mouse devices, touch screens, track pads, trackballs, scroll wheels, digital cameras, microphones, sensors, and the like, that enable the meal recommendation system 320 to receive data from a user (such as, for example, via the user device 402).

In examples of the disclosed technology, the meal recommendation system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The meal recommendation system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The meal recommendation system 320 may be configured to adjust model parameters during training. Model parameters may include weights, coefficients, offsets, or the like. Training may be supervised or unsupervised.

The meal recommendation system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The meal recommendation system 320 may be configured to optimize statistical models using known optimization techniques.

Furthermore, the meal recommendation system 320 may include programs configured to retrieve, store, and/or analyze properties of data models and datasets. For example, meal recommendation system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The meal recommendation system 320 may include algorithms to determine a data type, key-value pairs, row-column data structure, statistical distributions of information such as keys or values, or other property of a data schema may be configured to return a statistical profile of a dataset (e.g., using a data-profiling model). The meal recommendation system 320 may be configured to implement univariate and multivariate statistical methods. The meal recommendation system 320 may include a regression model, a Bayesian model, a statistical model, a linear discriminant analysis model, or other classification model configured to determine one or more descriptive metrics of a dataset. For example, meal recommendation system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The meal recommendation system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, meal recommendation system 320 may be configured to generate a similarity metric representing a measure of similarity between data in a dataset. A similarity metric may be based on a correlation, covariance matrix, a variance, a frequency of overlapping values, or other measure of statistical similarity.

The meal recommendation system 320 may be configured to generate a similarity metric based on data model output, including data model output representing a property of the data model. For example, meal recommendation system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The meal recommendation system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The meal recommendation system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, meal recommendation system 320 is configured to generate and/or train a classification model to classify a dataset, consistent with disclosed embodiments.

The meal recommendation system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the meal recommendation system may analyze information applying machine-learning methods.

While the meal recommendation system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the meal recommendation system 320 may include a greater or lesser number of components than those illustrated. In some embodiments, the meal recommendation system 320 may operate on a server and interface with a user device 402. In alternatively embodiments, the meal recommendation system 320 may operate on user device 402, receive transaction data from a server, and display associated graphical user interfaces on the user device for interacting with the user.

FIG. 4 is a block diagram of an example system that may be used to view and interact with data system 408, according to an example implementation of the disclosed technology. The components and arrangements shown in FIG. 4 are not intended to limit the disclosed embodiments as the components used to implement the disclosed processes and features may vary. As shown, data system 408 may interact with a user device 402 via a network 406. In certain example implementations, the data system 408 may include a local network 412, a meal recommendation system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the data system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the data system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The data system 408 may be associated with and optionally controlled by one or more entities such as a business, corporation, individual, partnership, or any other entity that provides one or more of goods, services, and consultations to individuals such as customers. In some embodiments, the data system 408 may be controlled by a third party on behalf of another business, corporation, individual, partnership. The data system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the meal recommendation system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the data system 408 to interact with one another and to connect to the network 406 for interacting with components in the system 400 environment. In some embodiments, the local network 412 may include an interface for communicating with or linking to the network 406. In other embodiments, certain components of the data system 408 may communicate via the network 406, without a separate local network 406.

The data system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access data system 408 using the cloud computing environment. User device 402 may be able to access data system 408 using specialized software. The cloud computing environment may eliminate the need to install specialized software on user device 402.

In accordance with certain example implementations of the disclosed technology, the data system 408 may include one or more computer systems configured to compile data from a plurality of sources the meal recommendation system 320, web server 410, and/or the database 416. The meal recommendation system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Although the preceding description describes various functions of a web server 410, a meal recommendation system 320, and a database 416 in some embodiments, some or all of these functions may be carried out by a single computing device.

Example Use Case

The following example use case describes an example of a typical user flow pattern. This section is intended solely for explanatory purposes and not in limitation.

In one example, Scott has a credit card and associated account. Scott has input into the account that he likes Mexican food and typically cooks for 4 people. Scott generally enters meals he consumes into the application. Scott purchases his groceries at a supermarket on Sundays and on average, eats out twice a week. Scott typically also goes to Italian restaurants between once and twice a week. Scott gets home after work on a Wednesday and opens a mobile application on his smartphone to see what he can prepare. The meal recommendation system 320 retrieves Scott's user data and the transaction data from Scott's credit card (block 102). From the transaction data, the meal recommendation system 320, identifies that Scott purchased milk, rice, beans, tomatoes, celery, chicken stock, and sausage from the grocery store on Sunday (block 104). The meal recommendation system 320 also generates a food profile for Scott, and determines that, based on the feedback of other users, Scott may also enjoy Spanish food (block 106). The meal recommendation system 320 generates an estimate of ingredients that Scott has currently available as of the current time (Wednesday evening). The meal recommendation system 320 determines that Scott ate the celery for a snack on Monday using data that Scott input into the app. The meal recommendation system 320 therefore determines that Scott has milk, rice, beans, tomatoes, chicken stock, and sausage to cook a meal (block 108). The meal recommendation system 320 then determines that since Scott has a carbohydrate (rice) and sausage (meat) that Scott has sufficient ingredients to make a meal (block 110). Therefore, from the estimate of ingredients (milk, rice, beans, tomatoes, chicken stock, and sausage), the meal recommendation system 320 generates one or more recipes for Scott comprising (1) Spanish bean soup and (2) paella, with the paella missing shrimp, a required ingredient (block 112). The meal recommendation system 320 generates a graphical user interface listing the recipes (block 114) and transmits the graphical user interface to Scott's smartphone (block 116). The graphical user interface shows the Spanish bean soup first because Scott has all the ingredients to make the recipe. The graphical user interface shows the paella with a note that additional ingredients (shrimp) is required. Scott presses a button on his smartphone screen to delete the Spanish bean soup from the options. The graphical user interface then regenerates to position the paella first. The meal recommendation system 320, now determining that Scott no longer has ingredients on hand to make a meal he likes, uses Scott's food profile to generate dining options. The meal recommendation system 320 generates two dining options John's Pizza and Chris' Chicken (block 118). The meal recommendation system 320 generates a graphical user interface to display the list entries for John's Pizza and Chris' Chicken below the paella (block 120) and transmits the graphical user interface to Scott's smartphone (block 122). John's Pizza is displayed first because Scott is a frequent visitor based on his transaction history and Scott enjoys Italian food (as described in his food profile). Scott scrolls through the options of the graphical user interface on this smartphone. For the paella, the graphical user interface displays that the closest market with shrimp is 3 miles away from Scott's current location. For John's Pizza, the graphical user interface displays that the nearest location is 0.5 miles away and also displays a coupon for John's Pizza ("Buy two slices and get a third slice free"). Scott selects to go to John's Pizza using the graphical user interface on his smartphone and the smartphone provides turn-by-turn directions to John's pizza.

In some examples, disclosed systems or methods may involve one or more of the following clauses:

Clause 1: A system comprising: one or more processors; memory in communication with the one or more processors and storing instructions that are configured to cause the system to: receive or retrieve first data and user input data associated with a user; identify ingredient data from the first data; generate, using a first machine learning model, a food profile for the user, based on the ingredient data and the user input data; generate, using a second machine learning model, an estimate of ingredients based on the ingredient data and the user input data; determine, from the estimate of ingredients, whether the user has sufficient ingredients to make a meal; responsive to determining that the user has sufficient ingredients: generate, using a third machine learning model, based on the estimate of ingredients the user has remaining and the food profile, one or more cooking instructions; generate a first graphical user interface comprising the one or more cooking instructions based on the estimate of ingredients the user has remaining; transmit the first graphical user interface to a user device for display; responsive to determining that the user does not have sufficient ingredients: generate, using a fourth machine learning model, based on the food profile, one or more dining options for the user; generate a second graphical user interface comprising the one or more dining options; and transmit the second graphical user interface to the user device for display.

Clause 2: The system of clause 1, wherein the first machine learning model is a clustering model, and wherein the first machine learning model receives an input of prior card data to determine a type of food the user enjoys and a frequency the user consumes the type of food.

Clause 3: The system of clause 1, wherein the user input data comprises user food preferences, food allergies, diets, food consumed, food tracking, typical party size, or combinations thereof.

Clause 4: The system of clause 1, wherein: the user input data comprises food data received via object detection from a smart fridge; the ingredient data is identified from the first data by selecting entries associated with food; and the food profile is generated by comparing similarities in palates and food habits between the user and prior users.

Clause 5: The system of clause 1, wherein generating the one or more cooking instructions further comprises: receiving or retrieving generic cooking instructions from a database; determining from the user input data, that the generic cooking instructions are an incorrect size for a typical dining party associated with the user; and adjusting proportions of the generic cooking instructions to fit the typical dining party associated with the user.

Clause 6: The system of clause 1, wherein the first graphical user interface displays the one or more cooking instructions in a list format comprising an order of the one or more cooking instructions based on the food profile of the user, wherein the most desirable cooking instructions to the user are placed in the list first.

Clause 7: The system of clause 6, wherein the memory stores further instructions that are configured to cause the system to: receive, via the first graphical user interface, an indication from the user device that the user does not want a selected set of cooking instructions from the one or more cooking instructions; generate a revised first graphical user interface comprising a revised order of the one or more cooking instructions without the selected set of cooking instructions; and transmit the revised first graphical user interface for display.

Clause 8: The system of clause 7, wherein the memory stores further instructions that are configured to cause the system to: train the second machine learning model based on the indication received from the user device.

Clause 9: The system of clause 1, wherein the second graphical user interface further comprises coupons for dining options that are within the food profile of the user.

Clause 10: A system comprising: one or more processors; memory in communication with the one or more processors and storing instructions that are configured to cause the system to: receive or retrieve first data and user input data associated with a user; generate, using a first machine learning model, an estimate of ingredients based on the first data and the user input data; generate, using a second machine learning model, based on the estimate of ingredients, one or more cooking instructions or an output that the user does not have sufficient ingredients to use any of the one or more cooking instructions; responsive to generating the one or more cooking instructions: generate a first graphical user interface comprising the one or more cooking instructions based on the estimate of ingredients the user has remaining; transmit the first graphical user interface to a user device for display; responsive to generating the output that the user does not have sufficient ingredients to use any of the one or more cooking instructions: generate, using a third machine learning model, based on the user input data and the first data, one or more dining options for the user; generate a second graphical user interface comprising the one or more dining options; and transmit the second graphical user interface to the user device for display.

Clause 11: The system of clause 10, wherein the memory stores further instructions that are configured to cause the system to: determining, from the estimate of ingredients, that the user is running low on ingredients; generate a third graphical user interface indicating to the user that they are running low on a selection of ingredients; and transmit the third graphical user interface for display.

Clause 12: The system of clause 11, wherein the third graphical user interface further comprises coupons for the selection of ingredients from a store.

Clause 13: The system of clause 12, wherein the third graphical user interface further comprises an interactive map showing a user location and showing directions to the store.

Clause 14: The system of clause 10, wherein the second graphical user interface displays the one or more dining options in a list format based on the user input data and the first data, wherein the most desirable dining options to the user are placed in the list first.

Clause 15: The system of clause 14, wherein the memory stores further instructions that are configured to cause the system to: receive, via the second graphical user interface, an indication from the user device that the user does not like a selected dining option from the one or more dining options; generate a revised second graphical user interface comprising a revised order of the one or more dining options without the selected dining options; and transmit the revised second graphical user interface for display.

Clause 16: The system of clause 15, wherein the memory stores further instructions that are configured to cause the system to: train the third machine learning model based on the indication received from the user device.

Clause 17: A system comprising: one or more processors; memory in communication with the one or more processors and storing instructions that are configured to cause the system to: receive or retrieve first data and user input data associated with a user; generate, using a first machine learning model, based on the first data and the user input data, one or more cooking instructions or an output that all of the one or more cooking instructions require additional ingredients to cook; responsive to generating the one or more cooking instructions: generate a first graphical user interface comprising the one or more cooking instructions; transmit the first graphical user interface to a user device for display; responsive to generating the output that all of the one or more cooking instructions require additional ingredients to cook: generate a second graphical user interface comprising the one or more cooking instructions and including one or more ingredients that the user needs to obtain to follow the cooking instructions; and transmit the second graphical user interface to the user device for display.

Clause 18: The system of clause 17, wherein the memory stores further instructions that are configured to cause the system to: receive a signal from the user device via the second graphical user interface indicating that the user would like to opt-in to view ingredient substitutes for the one or more cooking instructions; generate a revised second graphical user interface comprising the one or more cooking instructions and including one or more ingredient substitutes that the user may use to follow the one or more cooking instructions; and transmit the revised second graphical user interface to the user device for display.

Clause 19: The system of clause 18, wherein the memory stores further instructions that are configured to cause the system to: generate, using a second machine learning model, the one or more ingredient substitutes for each of the one or more cooking instructions.

Clause 20: The system of clause 17, wherein the second graphical user interface contains an interactive map showing user location and showing directions to the closest store where the user can obtain the one or more ingredients needed to follow the one or more cooking instructions.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors; and
memory in communication with the one or more processors and storing instructions that are configured to cause the system to:
receive or retrieve user input data associated with a user;
receive or retrieve, from an account provider system, first data associated with the user, wherein the first data comprises transaction data comprising item-specific data comprising one or more of an item name, an item description, an item quantity, an item price, an identification number of an item, a SKU number of an item, or combinations thereof;
identify ingredient data from the first data;
generate, using a first machine learning model, a food profile for the user, based on the ingredient data and the user input data;
generate, using a second machine learning model, an estimate of ingredients based on the ingredient data and the user input data;
determine, from the estimate of ingredients, whether the user has sufficient ingredients to make a meal;
responsive to determining that the user has sufficient ingredients:
generate, using a third machine learning model, based on the estimate of ingredients the user has remaining and the food profile, one or more cooking instructions;
generate a first graphical user interface comprising the one or more cooking instructions based on the estimate of ingredients the user has remaining;
transmit the first graphical user interface to a user device for display;
responsive to determining that the user does not have sufficient ingredients:
generate, using a fourth machine learning model, based on the food profile, one or more dining options for the user;
generate a second graphical user interface comprising the one or more dining options; and
transmit the second graphical user interface to the user device for display.

2. The system of claim 1, wherein the first machine learning model is a clustering model, and wherein the first machine learning model receives an input of prior card data to determine a type of food the user enjoys and a frequency the user consumes the type of food.

3. The system of claim 1, wherein the user input data comprises user food preferences, food allergies, diets, food consumed, food tracking, typical party size, or combinations thereof.

4. The system of claim 1, wherein:
the user input data comprises food data received via object detection from a smart fridge;
the ingredient data is identified from the first data by selecting entries associated with food; and
the food profile is generated by comparing similarities in palates and food habits between the user and prior users.

5. The system of claim 1, wherein generating the one or more cooking instructions further comprises:
receiving or retrieving generic cooking instructions from a database;
determining from the user input data, that the generic cooking instructions are an incorrect size for a typical dining party associated with the user; and
adjusting proportions of the generic cooking instructions to fit the typical dining party associated with the user.

6. The system of claim 1, wherein the first graphical user interface displays the one or more cooking instructions in a list format comprising an order of the one or more cooking instructions based on the food profile of the user, wherein the most desirable cooking instructions to the user are placed in the list first.

7. The system of claim 6, wherein the memory stores further instructions that are configured to cause the system to:
receive, via the first graphical user interface, an indication from the user device that the user does not want a selected set of cooking instructions from the one or more cooking instructions;
generate a revised first graphical user interface comprising a revised order of the one or more cooking instructions without the selected set of cooking instructions;
transmit the revised first graphical user interface for display; and
train the second machine learning model based on the indication received from the user device.

8. The system of claim 1, wherein the second graphical user interface further comprises coupons for dining options that are within the food profile of the user.

9. The system of claim 1, wherein the transaction data further comprises one or more of bank account data, credit account data, transaction card data, or combinations thereof.

10. The system of claim 9, wherein the transaction data further comprises one or more of debit card data, credit card data, a transaction date, a transaction time, a merchant, a merchant location, a merchant category, if a card was or was not presented, restaurant data, or combinations thereof.

11. The system of claim 1, wherein identifying the ingredient data from the first data comprises utilizing the transaction data to determine one or more purchased items relevant to food preparation.

12. A system comprising:
one or more processors; and
memory in communication with the one or more processors and storing instructions that are configured to cause the system to:
receive or retrieve user input data associated with a user;
receive or retrieve, from an account provider system, first data associated with the user, wherein the first data comprises transaction data comprising item-specific data comprising one or more of an item name, an item description, an item quantity, an item price, an identification number of an item, a SKU number of an item, or combinations thereof;
generate, using a first machine learning model, an estimate of ingredients based on the first data and the user input data;
generate, using a second machine learning model, based on the estimate of ingredients, one or more cooking instructions or an output that the user does not have sufficient ingredients to use any of the one or more cooking instructions;
responsive to generating the one or more cooking instructions:
generate a first graphical user interface comprising the one or more cooking instructions based on the estimate of ingredients the user has remaining;
transmit the first graphical user interface to a user device for display;
responsive to generating the output that the user does not have sufficient ingredients to use any of the one or more cooking instructions:
generate, using a third machine learning model, based on the user input data and the first data, one or more dining options for the user;
generate a second graphical user interface comprising the one or more dining options; and
transmit the second graphical user interface to the user device for display.

13. The system of claim 12, wherein the memory stores further instructions that are configured to cause the system to:
determining, from the estimate of ingredients, that the user is running low on ingredients;
generate a third graphical user interface indicating to the user that they are running low on a selection of ingredients; and
transmit the third graphical user interface for display, wherein the third graphical user interface further comprises coupons for the selection of ingredients from a store.

14. The system of claim 13, wherein the third graphical user interface further comprises an interactive map showing a user location and showing directions to the store.

15. The system of claim 12, wherein the second graphical user interface displays the one or more dining options in a list format based on the user input data and the first data, wherein the most desirable dining options to the user are placed in the list first.

16. The system of claim 15, wherein the memory stores further instructions that are configured to cause the system to:
receive, via the second graphical user interface, an indication from the user device that the user does not like a selected dining option from the one or more dining options;
generate a revised second graphical user interface comprising a revised order of the one or more dining options without the selected dining options; and
transmit the revised second graphical user interface for display.

17. The system of claim 16, wherein the memory stores further instructions that are configured to cause the system to:
train the third machine learning model based on the indication received from the user device.

18. A system comprising:
one or more processors; and
memory in communication with the one or more processors and storing instructions that are configured to cause the system to:
receive or retrieve user input data associated with a user;
receive or retrieve, from an account provider system, first data associated with the user, wherein the first data comprises transaction data comprising item-specific data comprising one or more of an item name, an item description, an item quantity, an item price, an identification number of an item, a SKU number of an item, or combinations thereof;
determine, using a first machine learning model, based on the first data and the user input data, whether the user has sufficient ingredients to satisfy one or more cooking instructions require additional ingredients to cook;
responsive determining the user has sufficient ingredients to satisfy the one or more cooking instructions:
generate a first graphical user interface comprising the one or more cooking instructions;
modify the first graphical interface to generate a modified first graphical user interface; and
transmit the modified first graphical user interface to a user device for display;
responsive to determining the user does not have sufficient ingredients to satisfy the one or more cooking instructions:
generate a second graphical user interface comprising one or more dining options and the one or more cooking instructions and including one or more ingredients that the user needs to obtain to satisfy the cooking instructions; and
transmit the second graphical user interface to the user device for display.

19. The system of claim 18, wherein the memory stores further instructions that are configured to cause the system to:
receive a signal from the user device via the second graphical user interface indicating that the user would like to opt-in to view ingredient substitutes for the one or more cooking instructions;
generate a revised second graphical user interface comprising the one or more cooking instructions and including one or more ingredient substitutes that the user may use to follow the one or more cooking instructions; and
transmit the revised second graphical user interface to the user device for display.

20. The system of claim 19, wherein the memory stores further instructions that are configured to cause the system to:
generate, using a second machine learning model, the one or more ingredient substitutes for each of the one or more cooking instructions, wherein the second graphical user interface contains an interactive map showing user location and showing directions to the closest store where the user can obtain the one or more ingredients needed to follow the one or more cooking instructions.

* * * * *